United States Patent
Shimada

(10) Patent No.: US 9,470,289 B2
(45) Date of Patent: Oct. 18, 2016

(54) VIBRATION ISOLATING DEVICE

(71) Applicant: YAMASHITA RUBBER KABUSHIKI KAISHA, Fujimino-shi, Saitama (JP)

(72) Inventor: Hitoshi Shimada, Fujimino (JP)

(73) Assignee: YAMASHITA RUBBER KABUSHIKI KAISHA, Fujimino-Shi (JP)

( * ) Notice: Subject to any disclaimer, the term of this patent is extended or adjusted under 35 U.S.C. 154(b) by 8 days.

(21) Appl. No.: 14/419,776

(22) PCT Filed: Aug. 10, 2013

(86) PCT No.: PCT/JP2013/071741
§ 371 (c)(1),
(2) Date: Feb. 5, 2015

(87) PCT Pub. No.: WO2014/027632
PCT Pub. Date: Feb. 20, 2014

(65) Prior Publication Data
US 2015/0219182 A1   Aug. 6, 2015

(30) Foreign Application Priority Data

Aug. 11, 2012  (JP) ................................ 2012-179123
Aug. 10, 2013  (JP) ................................ 2013-167199

(51) Int. Cl.
*F16F 15/08* (2006.01)
*B60K 5/12* (2006.01)

(52) U.S. Cl.
CPC ............. *F16F 15/08* (2013.01); *B60K 5/1208* (2013.01); *B60K 5/1241* (2013.01)

(58) Field of Classification Search
CPC ........ F16F 1/387; F16F 1/3873; F16F 15/08; B60K 5/1208; B60K 5/1241
See application file for complete search history.

(56) References Cited

U.S. PATENT DOCUMENTS

| 2007/0018367 | A1 | 1/2007 | Kamei | |
| 2007/0272051 | A1* | 11/2007 | Kamei | ................... B60G 7/001 74/579 R |

FOREIGN PATENT DOCUMENTS

| JP | 2009-115108 | 5/2009 |
| JP | 2009-115109 | 5/2009 |

(Continued)

OTHER PUBLICATIONS

International Search Report, Date of mailing: Nov. 19, 2013 (Nov. 19, 2013).

(Continued)

*Primary Examiner* — Anna Momper
(74) *Attorney, Agent, or Firm* — Rankin, Hill & Clark LLP

(57) ABSTRACT

A torque rod includes a rod main body, a first bushing and a second bushing. The rod main body is made of resin and provided integral with a first ring section and a second ring section on each end of an arm section. A first rib extends from the arm section to a front lateral surface of the second ring section. In a plan view, a second rib is provided to overlap with the first rib. The first rib projects forwardly of and in the left and right directions of the second rib. This projecting portion forms an enlarged diameter portion. Due to this enlarged diameter portion, an area of the first rib is made larger than an area of the second rib thereby to increase a rigidity of a forward side of the second ring.

19 Claims, 9 Drawing Sheets

(56) References Cited

FOREIGN PATENT DOCUMENTS

| | | |
|---|---|---|
| JP | 2011-213258 | 10/2011 |
| WO | 2005/023574 | 3/2005 |

OTHER PUBLICATIONS

Japanese Office Action dated May 20, 2016, Application No. 2013-167199, English translation included.

* cited by examiner

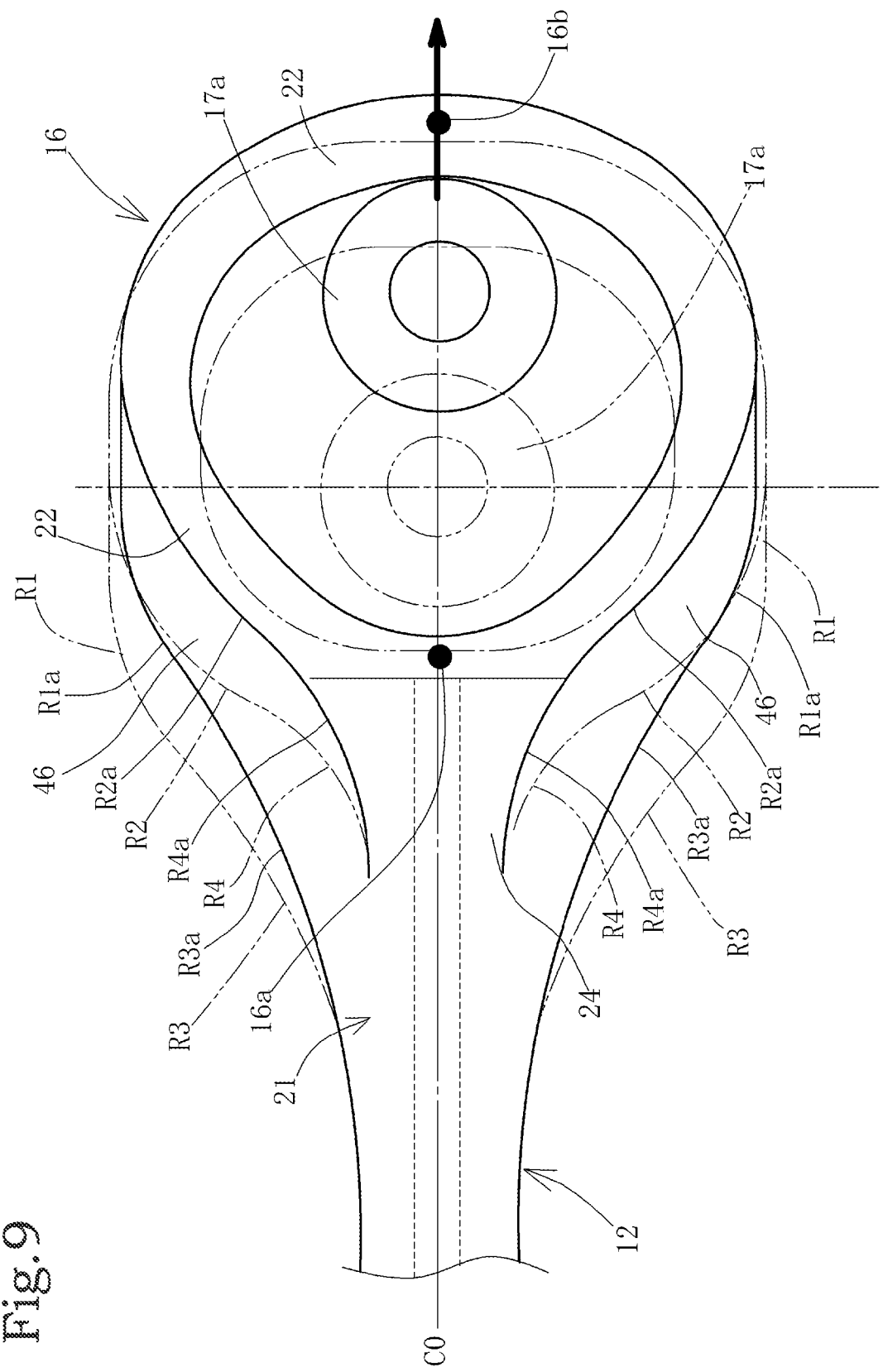

VIBRATION ISOLATING DEVICE

TECHNICAL FIELD

The present invention relates to a vibration isolating device which uses resin for a frame portion surrounding a vibration isolation main body such as rubber or the like and, more particularly, to the vibration isolating deice suitable for a torque rod.

BACKGROUND ART

The torque rod made of resin as above is publicly known and described in a patent reference 1, for instance. This torque rod is integrally provided with ring sections different in size at both ends in the longitudinal direction of an arm section. The small ring section is formed as a small round portion to be mounted on an engine side, while the large ring section is formed as a large round portion to be mounted on a vehicle body side. The small round portion and the large round portion each are provided with an inner cylinder located in a center portion of the ring section and an elastic member establishing a connection between the inner cylinder and the ring section.

In addition, on an outer circumference of the ring section of the large round portion, there are formed a plurality of ribs which extend in parallel in an axial direction of the inner cylinder. By providing the plurality of ribs it is possible to ensure the necessary rigidity and to realize a reduction in weight.

PRIOR ART REFERENCE

Patent reference 1: Japanese Patent Laid-open Publication JP 2011-213258 A.

DISCLOSURE OF THE INVENTION

Problem to be Solved by the Invention

By the way, the rigidity required for the ring sections is not uniform in the circumferential direction. Namely, when the power is applied through the arm section from the small round portion in the stretching direction, the large round portion is deformed since the large power is applied from the connecting portion between the arm section and the ring section, to the ring section, whereby the stress is concentrated on a rear end portion of the ring section and a forward end portion on the opposite side thereof. Therefore, it is necessary to heighten the rigidity of the ring section.

Then, although the rigidity is heightened by the provision of the ribs, in the case where the number of the ribs is increased and the ring is made larger, the weight is increased and the size becomes larger. However, when the ribs focusing on the difference in necessary rigidity in the forward and backward direction of the ring section are provided, there is a possibility of achieving the reduction in weight and the decrease in size. Hitherto, there is no torque rod giving such consideration, inclusive of the above prior art.

The present invention, therefore, has been made in view of the above circumstances, and it is an object of the present invention to provide the torque rod which is allowed to maintain a predetermined rigidity and to achieve the further reduction in weight and decrease in size.

Means for Solving the Problem

To solve the above described problems, a vibration isolating device according to a first aspect of the present invention comprises a main body (10) including an arm section (12), a first ring section (14) and a second ring section (16) located on both ends in a longitudinal direction of the arm section (12), a first bushing (15) being provided in the first ring section (14), a second bushing (17) being provided in the second ring section (16), and a plurality of horizontal ribs being formed continuously on outer peripheries of the arm section (12) and at least one (16) of the ring sections in a direction of a center axis of the bushing (17), wherein, in a plan view, the horizontal ribs are placed in upwardly and downwardly overlapping relation with each other and include a first rib (21) and a second rib (22) which are different in area, and the first rib (21) of a larger area has an enlarged diameter portion (46) extending outwardly of the second rib (22) of a smaller area.

According to a second aspect of the present invention, in addition to the first aspect, the ring section (16) has a front side portion (16A) which is connected to the arm section (16) on a forward side with respect to the center axis (C2) of the bushing (17) and a rear side portion (16B) located on an opposite side, and the first rib (21) is of an unsymmetrical configuration between the front side portion (16A) and the rear side portion (16B).

According to a third aspect of the present invention, in addition to the second aspect, when a minimum distance of a center distance between an outer periphery of the first rib (21) and a center (Q) of the bushing (17) is 1, a center distance between an outer periphery of the enlarged diameter portion (46) and the center (Q) is not less than 1.

According to a fourth aspect of the present invention, in addition to any one of the first to third aspects, the first rib (21), the second rib (22) and another third horizontal rib (23) are provided on the outer periphery of the ring section (16), and recesses are formed along each of the horizontal ribs, wherein a depth (D2, D3) of the recess (33, 34) extending along the enlarged diameter portion (46) of the first rib (21) is greater than a depth (D1) of the recess (32) extending along the third rib (23).

According to a fifth aspect of the present invention, in addition to any one of the second to fourth aspects, in a front view, a plurality of ribs including the first rib (21) are provided in the front side portion (16A), and a plurality of ribs including the third rib (23) different from the first rib (21) and the second rib (22) are provided in the rear side portion (16B), wherein the number of ribs provided in the front side portion (16A) is different from the number of ribs provided in the rear side portion (16B).

According to a sixth aspect of the present invention, in addition to the fifth aspect, the horizontal ribs of the front side portion (16A) and the rear side portion (16B) are continuously formed integral with each other by a vertical rib (25) which is formed long in the axial direction of the bushing (17) on an outer peripheral surface of the one (16) of the ring sections.

According to a seventh aspect of the present invention, in addition to the sixth aspect, the second rib (22) is formed in an annular shape on an end portion in an axial direction of the one (16) of the ring sections, and the second rib (22) is located outwardly in the axial direction with respect to the first rib (21).

According to an eighth aspect of the present invention, in addition to the seventh aspect, the second rib (22) is connected obliquely through a fourth rib (24) to the first rib (21).

According to a ninth aspect of the present invention, in addition to the eighth aspect, in a plan view, an outer peripheral portion of the enlarged diameter portion (46) of the first rib (21) and an edge portion in a left and right direction of the fourth rib (24) have a curved portion, respectively, wherein a radius (R1) of the curved portion of the first rib (21) is greater than a radius (R4) of the curved portion of the fourth rib (24).

According to a tenth aspect of the present invention, in addition to the eighth or ninth aspect, lightening (wall thickness reduction) recesses (33, 34) are formed between the first rib (21), the second rib (22) and the fourth rib (24).

Effects of the Invention

According to the first aspect of the present invention, the horizontal ribs are placed in upwardly and downwardly overlapping relation with each other, in a plan view, and include the first rib and the second rib (22) which are different in area, and the first rib of a larger area has the enlarged diameter portion extending outwardly of the second rib of a smaller area. With this construction, the necessary rigidity can be ensured by the first rib of a larger area having the enlarged diameter portion, and the reduction in weight can be achieved by the horizontal rib of a smaller area.

Further, the rigidity capable of sufficiently bearing tensile stress can be obtained by providing the enlarged diameter portion which makes an area larger. Accordingly, the proper rigidity can be distributed while considering the differences of the rigidity necessary in the forward and backward direction of the ring section, so that it is possible to improve the durability and to achieve the reduction in weight and the decrease in size.

According to the second aspect of the present invention, since the rib construction is of an unsymmetrical configuration between the front side portion and the rear side portion, the ribs can be arranged in such a manner as to obtain the optimum rigidity in accordance with each of locations in relation to the tensile stress and compressive stress.

According to the third aspect of the present invention, there are provided portions different in the center distance which is a distance between the center of the ring portion and the outer periphery of the rib, and, when the minimum center distance is 1, the center distance of the enlarged diameter portion is not less than 1. With this construction, the area of the enlarged diameter portion can be increased thereby to heighten the rigidity.

According to the fourth aspect of the present invention, since the depth of the recess extending along the enlarged diameter portion of the first rib is greater than the depth of the recess extending along the third rib, an amount of lightening (an amount of wall thickness reduction) in the vicinity of the enlarged diameter portion can be increased so as to reduce the weight, and the projection amount of the rib extending along the recess can be increased so as to form a rib having a larger area. In addition, since the rib is formed by the deep recess, the occurrence of void can be decreased and the rigidity of the rib can be improved.

According to the fifth aspect of the present invention, since the number of ribs provided in the front side portion is different from the number of ribs provided in the rear side portion, the rigidity can be adjusted between the front side portion and the rear side portion.

For instance, in the front side portion which is low in necessary rigidity, the number of ribs is relatively decreased so as to reduce the weight, while, in the rear side portion which is high in necessary rigidity, the number of ribs is relatively increased so as to heighten the rigidity. Like this, the setting of rigidity is properly distributed while considering the differences of the rigidity necessary in the forward and backward direction of the ring section, so that it is possible to ensure the necessary rigidity and to achieve the reduction in weight as far as possible.

According to the sixth aspect of the present invention, since the horizontal ribs of the front side portion and the rear side portion are continuously formed integral with each other by the vertical rib which is formed long in the axial direction of the bushing on the outer peripheral surface of the one ring section, the number and the configuration of the horizontal ribs of the front side portion and the rear side portion can be varied in accordance with the required rigidity in each of regions, and the horizontal ribs can be formed continuously integral with each other by the vertical rib located on the lateral side thereof so as to heighten the rigidity of the whole device.

According to the seventh aspect of the present invention, since the second rib, in the front side portion, is located outwardly in the axial direction with respect to the first rib, the necessary rigidity can be ensured by the first rib and the second rib. Moreover, when the lightening (the wall thickness reduction) is carried out between the first rib and the second rib, the reduction in weight can be achieved further.

According to the eighth aspect of the present invention, since there is provided the fourth rib which establishes an oblique connection between the firs rib and the second rib, the one of the ring sections can provide the high rigidity thereby distributing the stress between the first rib and the second rib, and, even if the number of the first rib is decreased, the rigidity of the front side portion of the one of the ring sections can be properly maintained.

According to the ninth aspect of the present invention, since the curve of the enlarged diameter portion of the first rib is greater than the curve of the fourth rib, the first rib is able to be formed wider and longer than the fourth rib, whereby the stress of the one of the ring sections can be effectively distributed to the arm section side by the first rib and the fourth rib.

According to the tenth aspect of the present invention, since the lightening recesses are formed between the first rib, the second rib and the fourth rib, the front side portion can be more lightened so as to contribute to the reduction in weight of the whole device. In addition, it is possible to increase the projecting amount of the first rib and the second rib thereby to make the area of the rib larger.

BRIEF DESCRIPTION OF THE DRAWINGS

FIG. 9 is a view of assistance in explaining the operation.

BEST MODE FOR CARRYING OUT THE INVENTION

Hereinafter, an embodiment of the present invention applied to a torque rod will be explained with reference to drawings.

Figure 1:
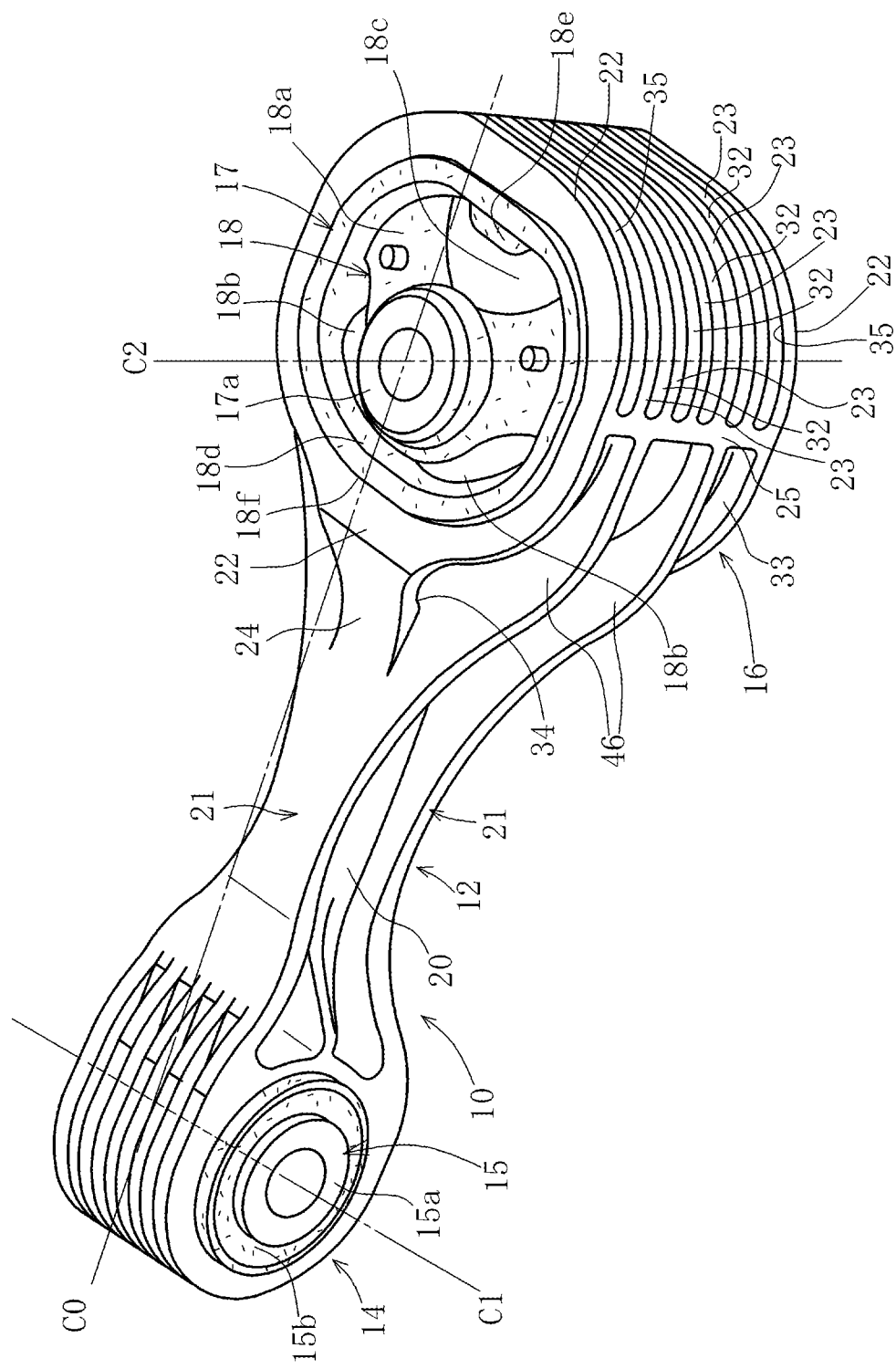
FIG. 1 is a perspective view of a torque rod in accordance with an embodiment of the present invention.
Figure 2:
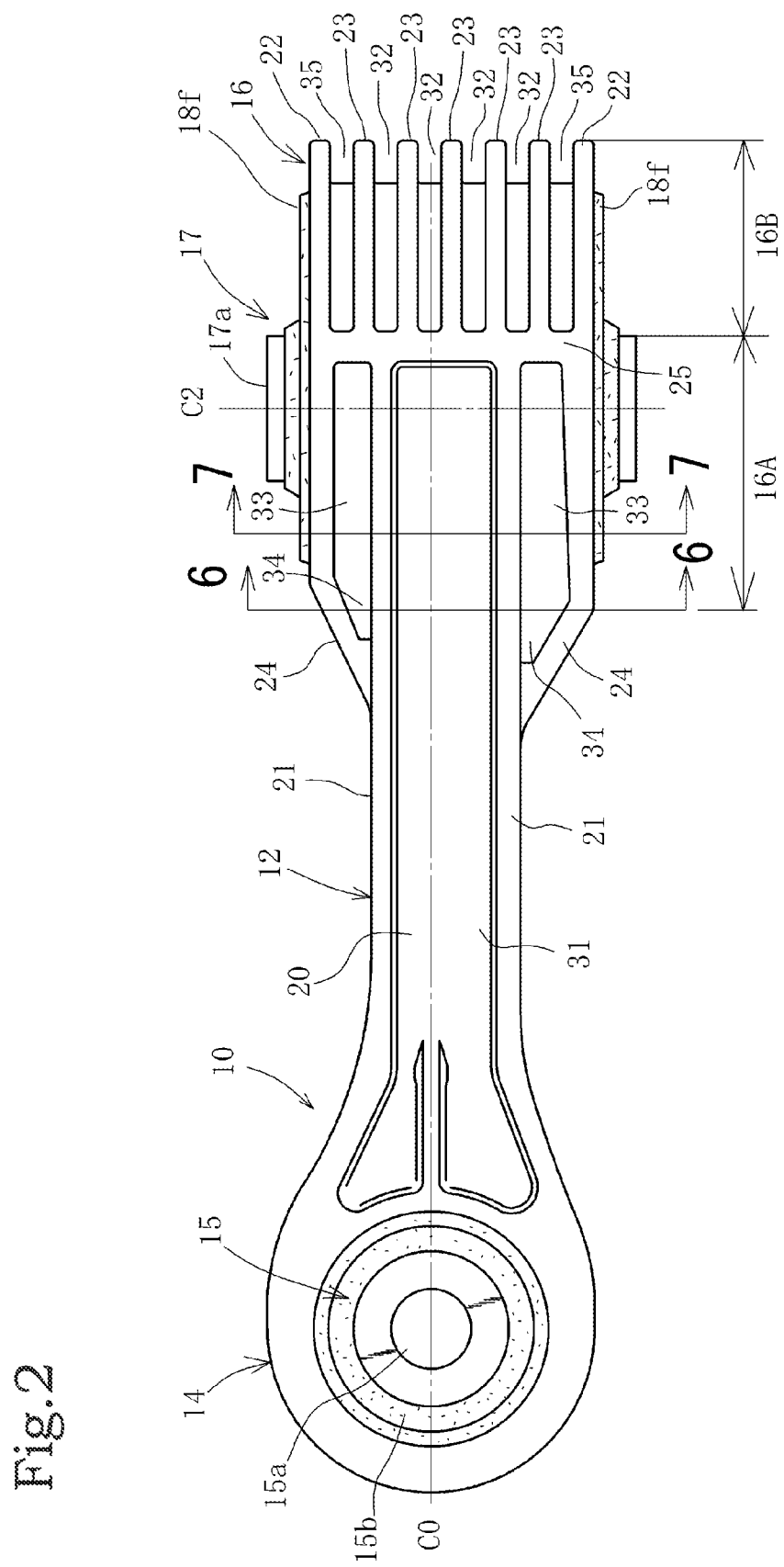
FIG. 2 is a front view of the above torque rod.
Figure 3:
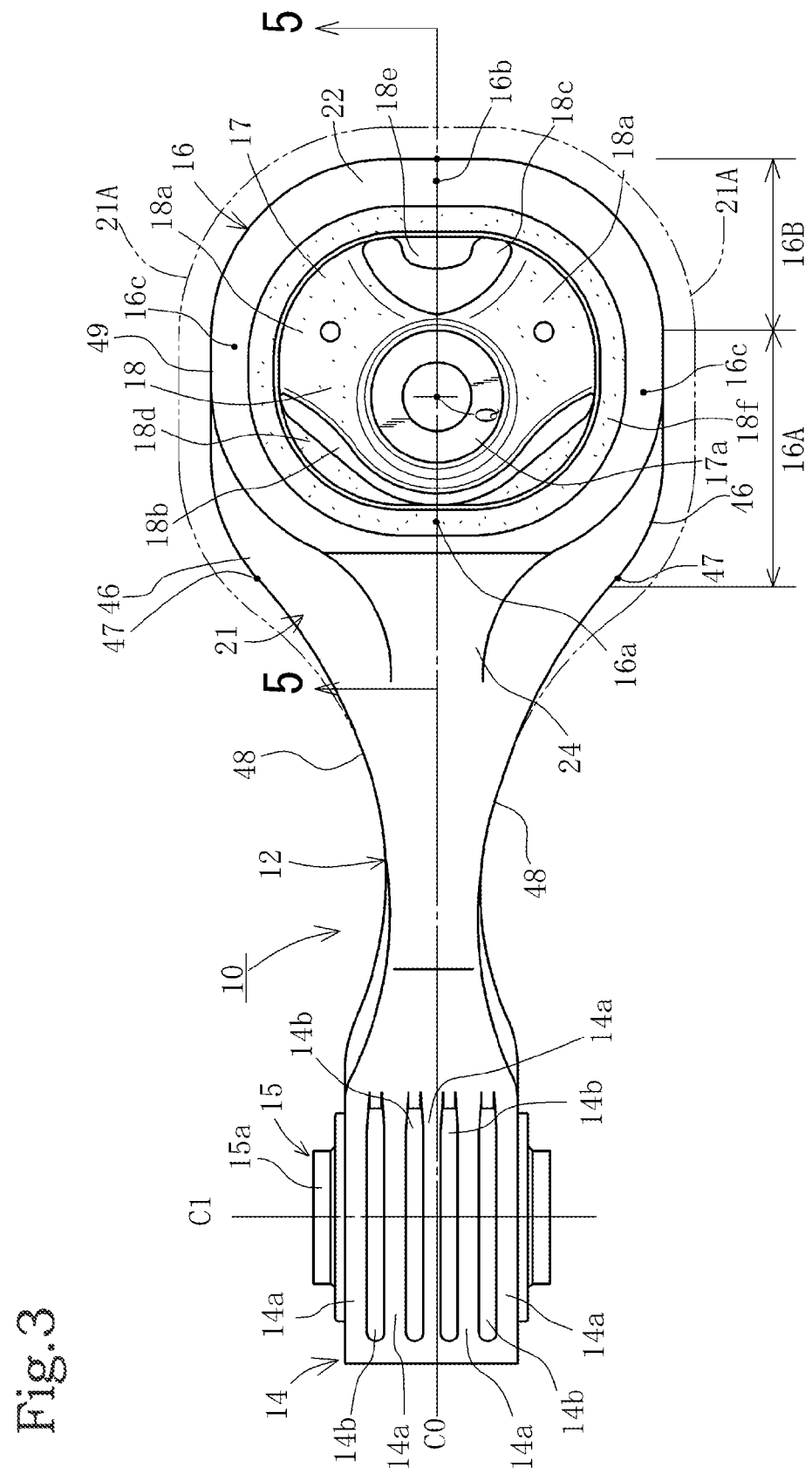
FIG. 3 is a plan view of the above torque rod.
Figure 4:
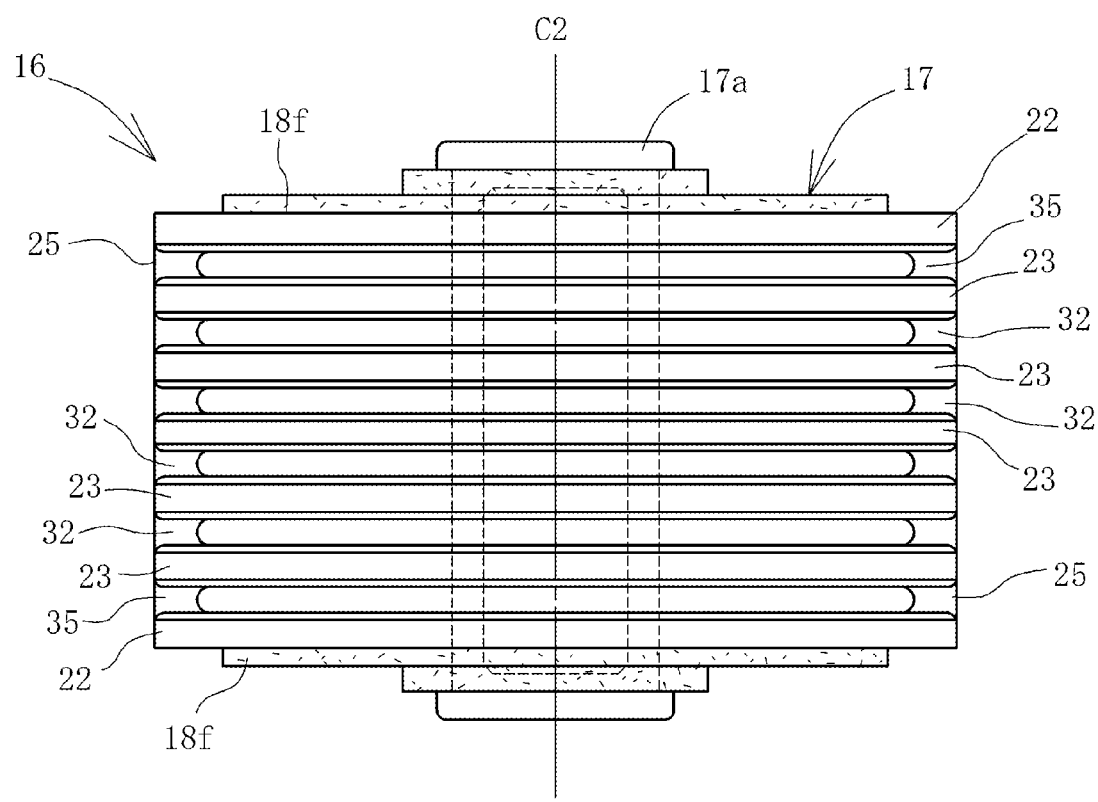
FIG. 4 is a side view of the above torque rod.
Figure 5:
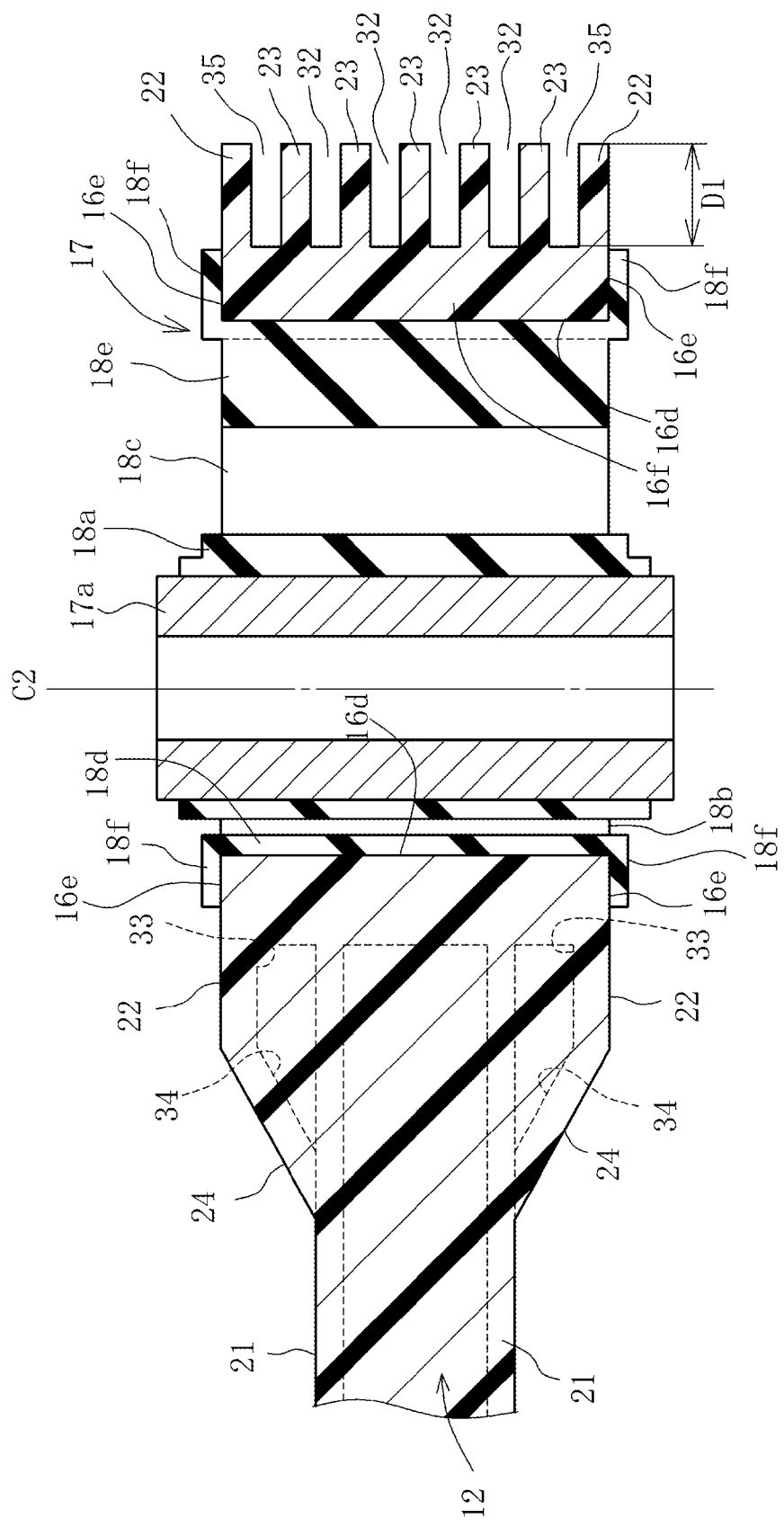
FIG. 5 is a cross sectional view taken along line 5-5 of FIG. 3.
Figure 6:
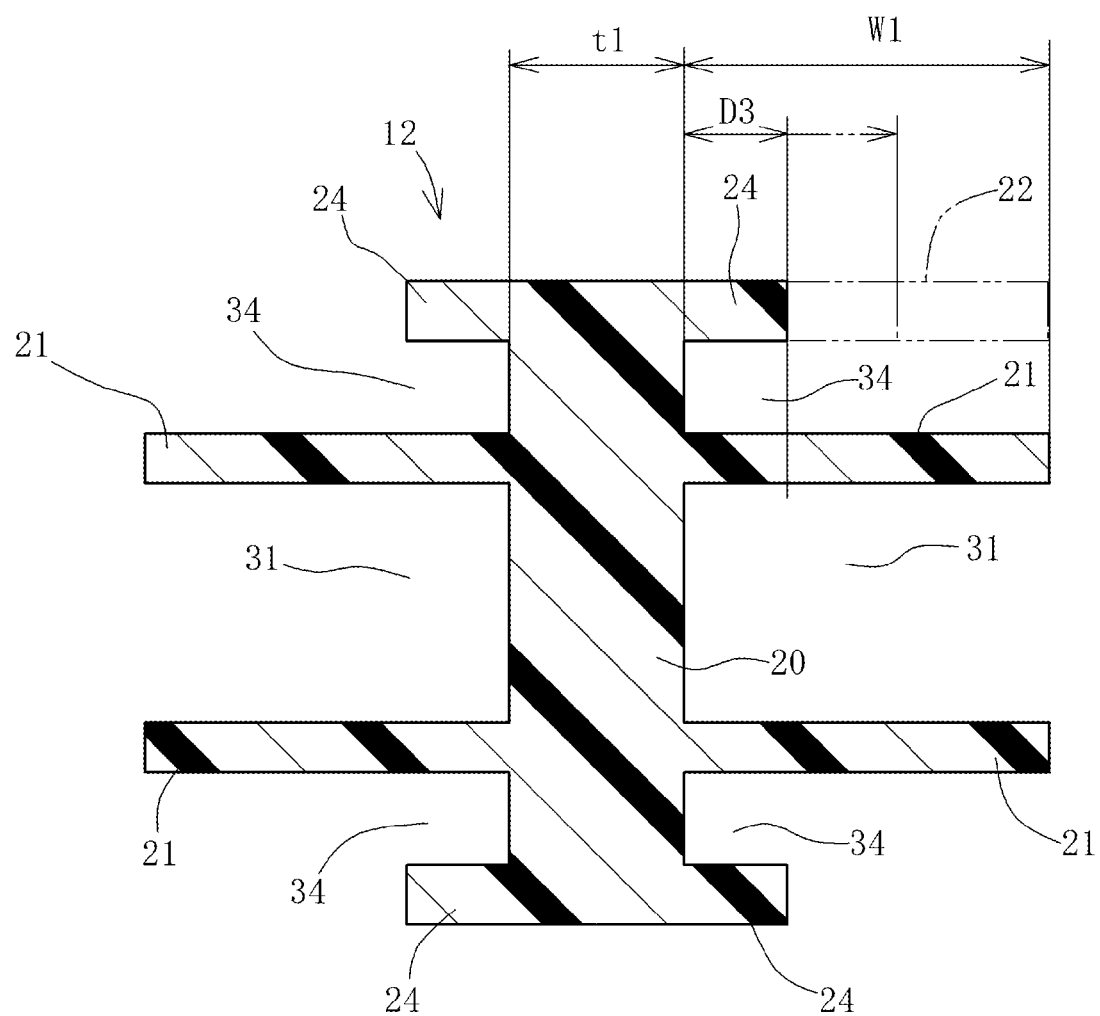
FIG. 6 is a cross sectional view taken along line 6-6 of FIG. 2.
Figure 7:
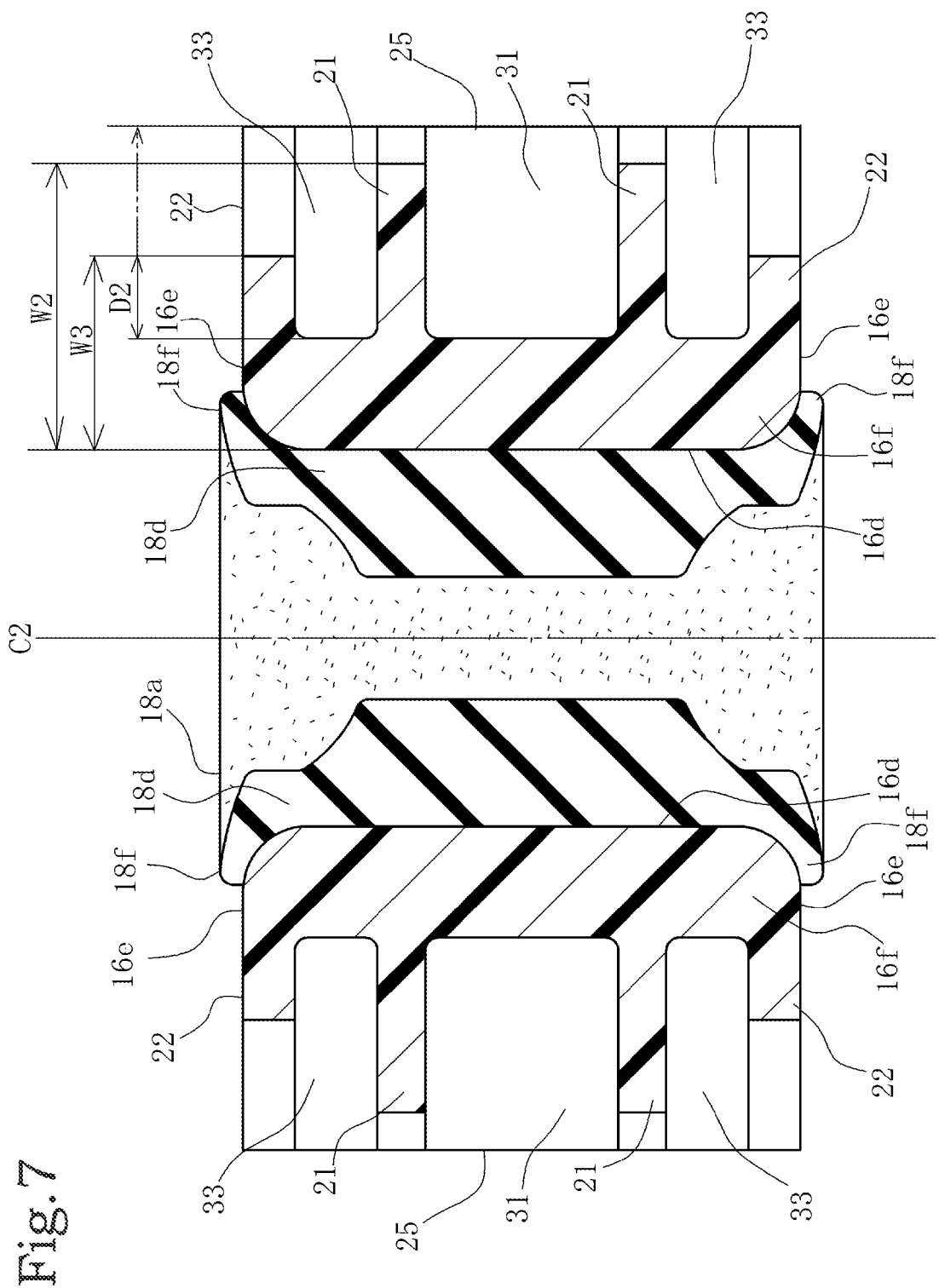
FIG. 7 is a cross sectional view taken along line 7-7 of FIG. 2.
Figure 8:
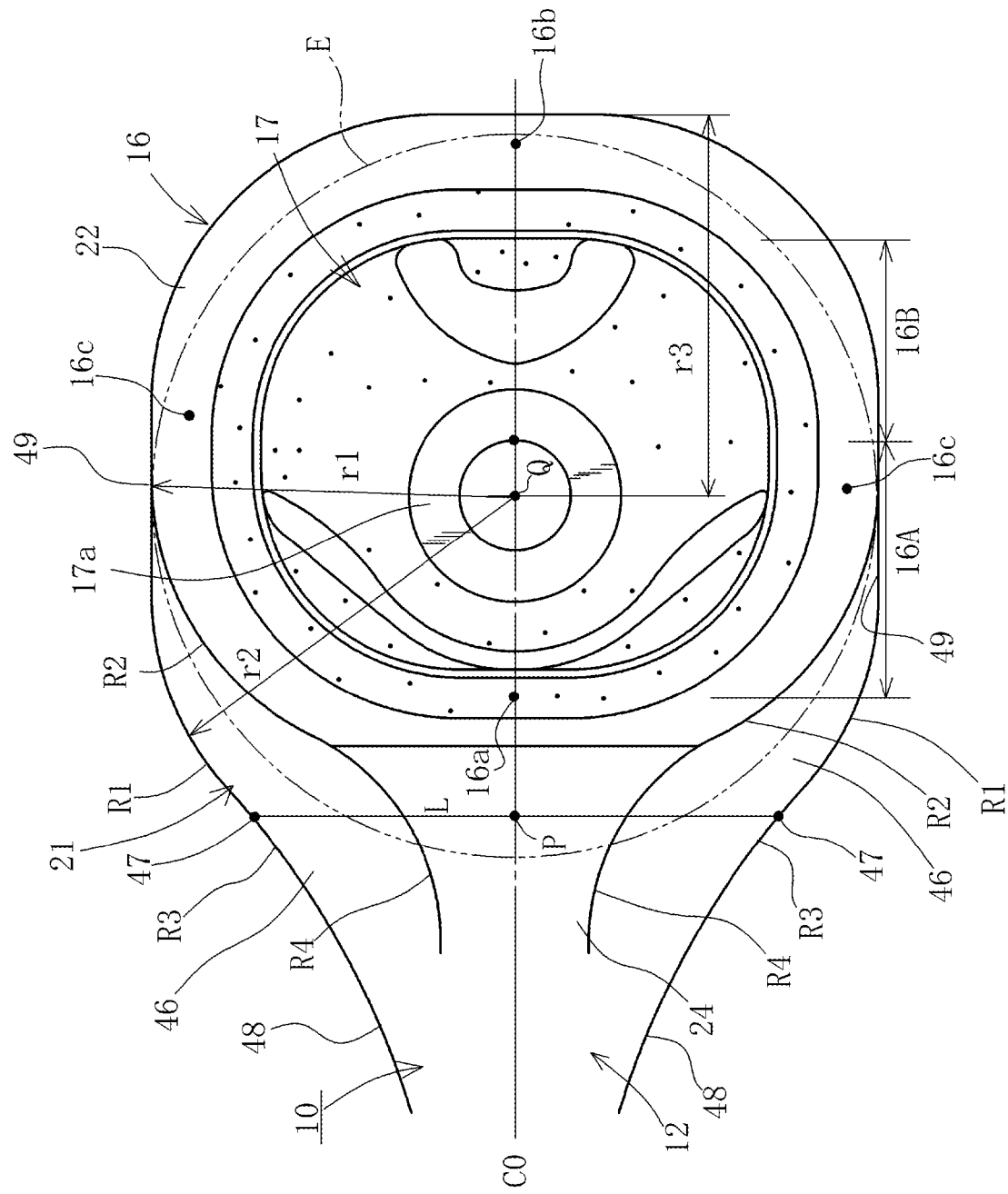
FIG. 8 is a partial enlarged view of FIG. 3.

FIG. 1 is a perspective view of a rod main body 10, FIG. 2 is a front view thereof, FIG. 3 is a plan view thereof, and FIG. 4 is a side view thereof. In addition, FIG. 5 is a cross sectional view taken along line 5-5 of FIG. 3, FIG. 6 is a cross sectional view taken along line 6-6 of FIG. 2, FIG. 7 is a cross sectional view taken along line 7-7 of FIG. 2, FIG. 8 is a partial enlarged view of FIG. 3, and FIG. 9 is an explanatory view when a tensile stress is inputted. In the following explanation, an upward and downward direction shall be an upward and downward direction shown in each of FIGS. 2 and 4 through 7, a left and right direction shall be an upward and downward direction of FIG. 3 on either side of a center line C0 (the direction orthogonal to the center line C0 in FIG. 3), and a forward and backward direction shall be a left and right direction in each of FIGS. 2 and 3 (the direction parallel to the center line C0 in FIG. 3).

This torque rod includes the rod main body 10 made of resin, a first bushing 15 and a second bushing 17 provided on both sides in the longitudinal direction of the rod main body 10. The first bushing 15 is mounted on an engine (not shown in the drawing) as a power source, for instance, and the second bushing 17 is mounted on a vehicle body (not shown) whereby to isolate the engine vibration so as not to be transmitted to the vehicle body side.

The rod main body 10 includes a longitudinally extending arm section 12, a first ring section 14 and a second ring section 16 provided on both sides in the longitudinal direction of the arm section 12. The first ring section 14 and the second ring section 16 which are in substantially a circular shape, respectively, are continuously connected in a radial direction to ends in the longitudinal direction of the arm section 12.

In the first ring section 14, there is provided the first bushing 15. The first bushing 15 is composed of an inner cylinder 15a which is arranged concentric with substantially a center portion of the first ring section 14, and a vibration isolating portion 15b of elastic material such as rubber or the like, which is filled into between the inner cylinder 15a and the first ring section 14 to elastically join these two members together. An axis of the inner cylinder 15a is designated by C1.

In the second ring section 16, there is also provided the second bushing 17. The second bushing 17 is composed of an inner cylinder 17a which is arranged concentric with substantially a center portion of the second ring section 16, and a vibration isolating portion 18 of elastic material such as rubber or the like. An axis of the inner cylinder 17a is designated by C2.

In a front view of FIG. 2, the torque rod is shown in the direction of the axis C1, and in a plan view of FIG. 3, it is shown in the direction of the axis C2.

In this embodiment, the axes C1 and C2 are provided in the directions orthogonal to each other. When a center line in the longitudinal direction of the arm section 12 is C0, the axes C1 and C2 are orthogonal to the center line C0 and extend in parallel with each other, respectively. However, angles of the axis C1 and the axis C2 relative to the center line C0 are optional, so that the axis C1 and the axis C2 may be set in such a manner as to intersect at right angles or optional angles when viewed from the direction of the center line C0.

In addition, the center line C0 is a line connecting an intermediate point in the axial direction of the axis C1 and an intermediate point in the axial direction of the axis C2. In this embodiment, in a plan view, the center line C0 extends along a center in the left and right width direction of the arm section 12.

When the first ring section 14 is arranged forwardly of the vehicle body while the second ring section 16 is arranged backwardly thereof, and when the inner cylinder 15a of the first bushing 15 is mounted on the engine side while the inner cylinder 17a of the second bushing 17 is mounted on the vehicle body side, the engine vibration is transmitted through the arm section 12 to the second ring section 16. When this vibration in the forward and backward direction is a main vibration to be isolated or damped by the rod main body 10, the direction of the center line C0 corresponds with an input direction of the main vibration. A state in which loads are imposed on the arm section 12 from the first ring section 14 toward the second ring section 16 is an input at the time of compression, and an inverse state is an input at the time of tension.

The vibration isolating portion 18 of the second bushing 17 is provided with elastic legs 18a extending left and right on either side of the inner cylinder 17a. These elastic legs 18a establish an elastic connection between the inner cylinder 17a and the second ring section 16.

The elastic legs 18a are separated from a covering portion 18d covering an inner periphery of the second ring section 16, by bored holes 18b, 18c which are formed in front and in the rear on either side of the inner cylinder 17a. The bored holes 18b, 18c are formed by boring a hole through the vibration isolating portion 18 in the direction of the axis C2 of the inner cylinder 17a.

A stopper 18e formed continuously integral with the covering portion 18d is configured to project into the rear bored hole 18c and is arranged in an opposed relation to a rear side of the inner cylinder 17a. The covering portion 18d is formed at an axial end portion thereof with an opening edge covering portion 18f which continuously covers an opening edge 16e (to be referred to later).

Next, the rod main body 10 will be explained in detail. The rod main body 10 is made of proper synthetic resin and preferably reinforced with fibers. The rod main body 10 is integrated into one unit by the steps of arranging in a metallic mold the first bushing 15 into which the inner cylinder 15a and the vibration isolating portion 15b are previously incorporated and the second bushing 17 into which the inner cylinder 17a and the vibration isolating portion 18 are incorporated, then, injecting synthetic resin into the peripheries of the first and second bushings 15, 17 by an injection molding method or the like, and hardening the synthetic resin.

Alternatively, the rod main body 10 may be integrated into one unit by the steps of arranging the previously formed rod main body 10 in the metallic mold, then placing the inner cylinder 15a in the first ring section 14 while placing the inner cylinder 17a in the second ring section 16, and injecting elastic material such as rubber into the first ring section 14 and the second ring section 16. In addition, the elastic connection between the elastic member of the vibration isolating portion 18 and the second ring section 16 may be established by adhesion, vulcanizing adhesion or press fitting, etc. of the elastic member to the second ring section 16.

The arm section 12 includes a pillar portion 20 and a pair of upper and lower first ribs 21 and is formed in an H-shape in cross section (see FIG. 6). The first ribs 21 project from the upper and lower sides of the pillar portion 20 in the left and right directions. The pillar portion 20 is connected integral with intermediate portions in the left and right direction of the upper and lower first ribs 21. The pillar portion 20 functions as a main body portion of the arm section 12 and is reinforced by the upper and lower first ribs 21 to provide necessary and sufficient rigidity. Portions corresponding to spaces surrounded by the pillar portion 20 and the first ribs 21 are hollowed out to form first recesses 31 which contribute to the reduction in weight.

As shown in FIG. 6, when a wall thickness of the pillar portion is t1 and a projecting amount of the first rib 21 from the pillar portion 20 is W1, W1>t1 (W1 is larger than t1).

Further, as shown in FIG. 3, on the outer periphery of the first ring section 14 there are formed a plurality of annular ribs 14a which extend in a circumferential direction. Between the neighboring ribs 14a there are formed relatively hollowed annular grooves 14b. In this manner, the ribs 14a are arranged in a rugged configuration whereby to achieve the reduction in weight and the high rigidity.

The second ring section 16, as shown in FIG. 3, has a front side portion 16A as a front half portion to which the arm section 12 is connected and a rear side portion 16B as a rear half portion which is located on the opposite side. In addition, a portion located in the vicinity of a forwardest end of the front side portion 16A on the center line C0 is referred to as a front portion 16a, while a portion located in the vicinity of a most backward end of the rear side portion 16B on the opposite side of the front portion 16a is referred to as a rear portion 16b. The front portion 16a and the rear portion 16b also constitute a forward side portion and a backward side portion on either side of the axis C2 (FIG. 2) of the inner cylinder 17a. Moreover, portions located in the left and right direction of the inner cylinder 17a are referred to as lateral portions 16c. In this case, the front side portion 16A is a portion located forwardly of the lateral portions 16c while the rear side portion 16B is a portion located backwardly of the lateral portions 16c (see FIGS. 2 and 3).

By the way, the required rigidity of the second ring section 16 at the time of inputting the tension when the first ring section 14 and the second ring section 16 are stretched in opposite directions to each other is highest at a portion of the rear portion 16b in the vicinity of a position located on the center line C0 on the outer peripheral side, and at a portion in the vicinity of lateral portions 16c on the inner peripheral side. Inversely, the required rigidity on the front portion side of the outer peripheral side of the second ring section 16 is relatively low.

At the time of inputting the compression, the inner cylinder 17a of the second bushing 17 moves relatively forwardly together with the second ring section 16 by a load transmitted in the direction of center line C0 from the arm section 12.

The first rib 21 extends to a front lateral surface of the second ring section 16. Namely, the first rib 21 is configured to extend from the arm section 12 to the front lateral surface of the second ring section 16, wherein a portion of the first rib 21 extending along the arm section 12 is referred to as an arm portion, and a portion overlapping with the front side portion 16A of the second ring 16 in a side view is referred to as a ring portion.

The front lateral surface of the second ring section 16 is integrally provided with the pair of upper and lower first ribs 21 and a pair of second ribs 22 which are spaced apart further upwardly and downwardly from the first ribs 21 and which form end surfaces in the upward and downward direction (the direction of the axis C2) of the second ring section 16.

The rear side portion 16B of the second ring section 16 is provided with third ribs 23.

The second ribs 22 are formed in a ring shape, in a plan view, which surrounds an entire circumference of an opening portion of a ring hole 16d (see FIG. 5) in the second ring section 16. The second ribs 22 make the rigidity of the opening portion greater whereby to prevent the breakage of the second ring section 16 when the second ring section 16 is stretched in the direction of the center line C0.

As shown in FIG. 5, the second ring section 16 is provided with the ring-hole 16d extending therethrough in the direction of the axis C2. Opening edges 16e of the ring hole-16d are formed on both ends in the axial direction of a tubular portion 16f around the ring-hole 16d. The opening edges 16e are formed continuous with the second ribs 22, and the fourth ribs 24 extend integrally forward from the front portions of the second ribs 22 in such a manner as to be connected to the arm portions of the first ribs 21.

The covering portion 18d as a portion of the vibration isolating portion 18 is formed integral with inner circumferential surfaces of the opening edges 16e and the tubular portion 16f of the second ring section 16 including the second ribs 22 such that the covering portion 18d partially cover the second ring section 16.

As shown in FIGS. 4 and 5, on the rear lateral surface of the second ring section 16, there are formed a plurality of third ribs 23 located between the upper and lower second ribs 22. In this embodiment, there are provided five third ribs 23. Each of the third ribs 23 is provided in a plane orthogonal to the axis C2. The third ribs 23 extend in parallel with each other and spaced apart from each other in the direction of the axis C2. In addition, as shown in FIG. 4 which is a rear side view of the second ring section 16, the third ribs 23 extend semi-circularly from the rear lateral sides to the rear surface of the second ring section 16. The third ribs 23 and the second ribs 22 correspond in a plan view with each other and are laid one on another in the upward and downward direction. The thickness of the third rib 23 is substantially the same as that of the second ribs 22 (FIG. 5).

Although the second rib 2 and the third rib 23 have substantially the same thickness as the first rib 21, the density of ribs on the rear side of the second ring section 16 is higher than that on the front side thereof, and the ribs on the rear side of the second ring section 16 are composed of the pair of upper and lower second ribs 22 and five third ribs 23 to make a total of seven ribs whereby the rear side portion 16B can be made sufficiently higher in rigidity.

As shown in FIGS. 2 and 5, the fourth rib 24 extends obliquely downwardly in the forward direction from an upper front portion of the second rib 22. The front end portion of the fourth rib 24 is connected integrally to an intermediate portion in the forward and backward direction of the upper surface of the arm portion of the first rib 21 on the center line C0.

Further, the fourth rib 24 extends obliquely upwardly in the forward direction from an lower front portion of the second rib 22. The front end portion of the fourth rib 24 is connected integrally to an intermediate portion in the forward and backward direction of the lower surface of the arm portion of the first rib 21 on the center line C0.

Namely, on the front side portion 16A of the second ring section 16, there are provided a total of six ribs composed of the pair of upper and lower first ribs 21, the pair of upper and lower second ribs 22 and the pair of upper and lower fourth ribs 24.

The fourth rib 24 establishes a connection between the front portion of the second rib 22 and an intermediate portion in the forward and backward direction and a central portion in the left and right direction of the first rib 21. In a plan view as shown in FIG. 3, the fourth ribs 24 are located on the center line C0 on the inside in the left and right direction of the first ribs 21 and have lateral surfaces of curved configuration.

When a radius of the curve of the fourth rib 24 is a fourth radius R4, a first radius R1 of the first rib 21 is larger than the fourth radius R4 of the fourth rib 24 (R1>R4). The fourth rib 24 is narrower in width than the first rib 21 and overlaps on the center line C0 with the intermediate portion in the left and right direction of the first rib 21.

By the way, the fourth rib 24 may be formed freely in a curved shape, a rectilinear shape, or a bent shape such as a crank shape or the like, in a front view (FIG. 2). In addition, the lateral side may be formed rectilinearly in a plan view (FIG. 3). In this case, although the relative sizes of the radii between the fourth rib 24 and the first rib 21 are not significant, the fourth ribs 24 in a plan view are narrower in width than the first ribs 21 and overlap with the first ribs 21 on the inside in the left and right direction thereof, in the same way as above.

As shown FIGS. 1 and 2, on the lateral surfaces of the second ring section 16, there are formed fifth ribs 25 each of which extends in the direction of the axis C2. The fifth rib 25 is connected continuously flush with the rear end portion of the first rib 21 and also connected continuously flush with the front end portion of the third rib 23. Moreover, an upper and lower ends of the fifth rib 25 are connected continuously flush with the intermediate portions in the forward and backward direction of the second ribs 22. The fifth rib 25 is provided in a maximum outer diameter region between the left and right lateral portions of the second ring section 16 in FIG. 3.

Since the fifth rib 25 is formed long in the axial direction of the inner cylinder 17a on the lateral surface of the second ring section 16, it shall be referred to as a vertical rib of the second ring section 16. On the other hand, since the first ribs 21, the third ribs 23 and the second ribs 22 are formed in the plane orthogonal to the axis of the inner cylinder 17a respectively, these ribs shall be referred to as horizontal ribs. In addition, the fourth ribs 24 shall be referred to an inclined rib.

The fifth rib 25 as the vertical rib connects each of the horizontal ribs which are arranged at different spaced intervals and formed in different shapes. These vertical and horizontal ribs are arranged flush with the outer surface of the fifth rib 25.

The lightening recesses are provided between these ribs. The greater first recesses 31 are provided between the pillar portion 20 and each of the upper and lower first ribs 21.

Since the arm section 12 is a load transmitting part from the first ring section 14 to the second ring section 16, it does not bear such a large stress as the second ring section 16. Accordingly, the sufficient rigidity is able to be obtained by only the pair of upper and lower first ribs 21, so that the lightening (the wall thickness reduction) can be performed as much as possible thereby to achieve the reduction in weight of the arm section 12.

As shown in FIG. 2, between the neighboring third ribs 23 there are formed second recesses 32 consisting of semicircular grooves. Similarly, between the second ribs 22 and the neighboring third ribs 23 there are formed fifth recesses 35 consisting of semicircular grooves.

Moreover, between the second rib 22 and the neighboring first rib 21 there is provided a third recess 33 which is smaller than the first recess 31 and larger than the second recess 32. The third recess 33 is a hollow lightening portion (a hollow wall thickness reducing portion) formed between the front half portion of the second rib 22 and the first rib 21.

Further, between the first rib 21 and the neighboring fourth rib 24 there is formed a fourth recess 34. This fourth recess 34 is of substantially a triangular shape in a front view of FIG. 2 and is continuously connected on the rear side thereof to the third recess 33. The fourth recess 34 is a hollow lightening portion formed between the first rib 21 and the fourth rib 24 which reinforces the front portion 16a which bears relatively large stress at the time of tension.

As shown in FIG. 2, front end portions in the circumferential direction of the second recess 32 and the fifth recess 35 extend to the fifth rib 25. In addition, each of rear end portions of the first recess 31 and the third recess 33 also extends to the fifth rib 25.

As shown in FIG. 7, the first rib 21 is wider than the second rib 22. Namely, In FIG. 3, the front portion of the second rib 22 overlaps with the first rib 21 on the inside position in the left and right direction of the first rib 21. The first rib 21 is formed wider than the second rib 22 so as to project left and right from the second rib 22.

When the width of the first rib 21 is W2 and the width of the second rib 22 is W3, the relation is W2>W3. Each of the widths W2, W3 corresponds to a projecting amount from the inner peripheral surface of the tubular portion 16f of the second ring section 16. The width W2 of the first rib 21 is greater than the width W3 of the second rib 22, and this means that an area of the first rib 21 is larger than an area of the second rib 22 in a plan view.

Further, the first rib 21 and the second rib 22 have the same width at a position of the fifth rib 25 located on the lateral surface of the second ring section 16. In a position forwardly of the fifth rib 25, the width W2 of the first rib 21 is larger than the width W3 of the second rib 22. As shown by a phantom line 21A in FIG. 3, however, the first rib 21 may be formed such that it surrounds the entire circumference of the outer peripheral surface of the second ring section 16. In this case, the width of the overlapping position of the first rib 21 with the second rib 22 is formed larger than the second rib 22 around the entire periphery or in a partial region.

The depths of the second recess 32 and the fifth recess 35 are designated by D1, respectively (FIG. 5). The depth of the third recess 33 is designated by D2 (FIG. 7). As shown by a phantom line in the drawing, the depth D2 of the third recess 33 increases with approaching the fifth rib 25 on the rear side. The depth of the fourth recess 34 is designated by D3 (FIG. 6).

In addition, as shown by a phantom line in the drawing, the depth D3 of the fourth rib 24 increases with approaching the second rib 22 on the rear side.

Further, projecting heights (the projecting amount in the radial direction of the second ring section 16) of the neighboring ribs are determined by these depths of the recesses. The depths D2 and D3 of the third recess 33 and the fourth recess 34 on the front half side are deeper than the depth D1 of the second recess 32 and the fifth recess 35 on the rear half side. With this construction, an amount of lightening (an amount of wall thickness reduction) of the front half side is increased, and projecting heights of the first rib 21, the second rib 22 and the fourth rib 24 are increased.

In addition, these recesses are formed as if the wall flush with the surfaces of the ribs is recessed by a machining process. However, in this embodiment, the ribs are formed by an injection molding, etc., and a mechanical working process such as recessing by the machining process is not used. Each of the ribs is formed as are relatively projecting portion with respect to each of the recesses.

Accordingly, the surfaces of these ribs form outer surfaces of the arm section 12 and the second ring section 16 in the supposed case where these recesses are not formed.

Next, the detailed construction most of which are the first rib 21 and the second rib 22 will be explained.

FIG. 8 is a view showing the second ring section 16 side in an enlarged scale, with the omission of other part in FIG. 3. As shown in FIG. 8, in the ring portion of the first rib 21, there are provided enlarged diameter portions 46 which extend outwardly in the direction orthogonal to the axis C2 of the inner cylinder 17a from the opening edge 16e (see FIG. 5) of the ring hole 16d of the second ring section 16 and which expand in the left and right directions with respect to the center line C0. By this enlarged diameter portions 46, the first rib 21 is enlarged in the left and right directions so as to be widened in width in the left and right directions. The second rib 22 is not provided with such enlarged diameter portions.

The first rib 21 is connected to the arm section 12 from the front lateral side of the second ring section 16 by the curve composed of the large radius R1 and a radius R3. The second rib 22 is formed in a curved shape of a smaller second radius R2 as arranged on an inner side of the first rib 21 in right and left direction.

Although the front edge portion of the ring portion in the enlarged diameter portion 46 of the first rib 21 is formed by the curve of the first radius R1, the arm portion therein is formed by the curve of the third radius R3 of an inverted radius. The first radius R1 and the third radius R3 are continuously connected at an inflection point 47, and the first radius R1 is smaller than the third radius R3 (R1<R3). In addition, the arm portion has arm curve portions 48 of the third radius R3. The width between the left and right arm curve portions is gradually narrowed toward the first ring section 14.

The distance between a center Q of the inner cylinder 17a of the second bushing 17 and an outer periphery of the ring portion is considered to be a center distance. In this center distance, when the distance between the center Q and a position corresponding to the lateral portion 16c is considered to be r1 and an hypothetical circle E letting this r1 be a radius is described by a phantom line, the front edge portion of the enlarged diameter portion 46 of the first rib 21 is formed in such a manner as to project outwardly from the hypothetical circle E, and the outer peripheral portion of the front half side of the second rib 22 is located inside the hypothetical circle E. The enlarged diameter portion 46 is also a portion projecting outwardly from the hypothetical circle E.

In a plan view (FIG. 8), the second rib 22 overlaps with the first rib 21, and corresponds therewith in the upward and downward direction at the lateral portion 16c thereof. However, in the front half side forwardly of the center Q, the first rib 21 extends outwardly from the second rib 22 by the enlarged diameter portion 46, so that the area of the first rib 21 is larger than the area of the second rib 22.

Further, when a straight line connecting the left and right inflection points 47 is considered to be L and an intersection point between this straight line L and the center line C0 is considered to be P, the intersection point P is located inside of the hypothetical circle E. Therefore, since the inflection point 47 comes relatively close to the center Q and the radius R3 is elongated, the arm portion of the enlarged potion 46 becomes relatively longer.

In here, the r1 is a minimum portion of the center distance between the center Q and the outer periphery of the ring portion. When the center distance between the outer periphery of the enlarged diameter portion 46 and the center Q is considered to be r2, the r2 is larger than the r1. Moreover, when the center distance from the center Q to the rear end portion on the center line C0 is considered to be r3, the r3 is larger than the r1 and smaller than the r2 (r1<r3<r2).

In the left end right direction of the inner cylinder 17a, a connecting region (the ends in the upward and downward direction of the fifth rib 25) between the first rib 21 and the second rib 22 forms a straight line portion 49 extending substantially parallel to the center line C0. A front end of the straight line portion 49 is substantially equal to a front end of the inner cylinder 17a. This straight line portion 49 is a tangential line of the hypothetical circle E. When circles (not shown) are described with radii of the r2 and the r3, the straight line portion 49 extends in the form of a chord across the circles.

Accordingly, since, due to this straight line portion 49, the maximum projecting amount of the first rib 21 or the second rib 22 in the left and right direction from the center Q is set to be the r1 and not to be the r2 or the r3, the projecting amount in the left and right direction is decreased whereby to compactify the first rib 21 and the second rib 22.

In addition, since the enlarged diameter portion 46 has the projecting amount not more than the r1, the projection amount in the left and right direction is decreased thereby obtaining a slim configuration.

Further, when the r1 is considered to be 1, the r2 and the r3 are not less than 1, and the enlarged diameter portion 46 of the first rib 21 and the rear half portion side of the second rib 22 have portions of not less than 1. Accordingly, the first rib 21 extends long on the front side thereof and the second rib 22 extends long on the rear side thereof, whereby to increase the rigidity in the direction of tension and compression.

Next, the operation will be explained. With respect to the ribs of the second ring section 16, in a front view as shown in FIG. 2, the first ribs 21, the second ribs 22 and the fourth ribs 24 are arranged on the front side of the axis C2 in a front view and the second ribs 22 and the third ribs 23 are arranged on the rear side of the axis C2, and the number of ribs is varied in such a manner as to be small on the front side thereof and to be large on the rear side thereof, so that the construction of the ribs is unsymmetrical in the forward and backward direction. In addition, since the first ribs 21 are provided in the only front side portion 16A, the first ribs 21 and the entire rib construction are unsymmetrical in a plan view. Like this, when the construction of ribs is configured to be unsymmetrical in the forward and backward direction, the rigidity of the second ring section 16 can be optimally distributed.

Further, with respect to the amount of the lightening (the amount of the wall thickness reduction), since the first recesses 31, the third recesses 33 and the fourth recesses 34 are provided on the front side and the second recesses 32 and the fifth recesses 35 are provided on the rear side, the rear side is smaller than the front side.

Therefore, the region of the rear portion 16b which bears the largest stress at the time of tension can provide sufficiently high rigidity, and the front side portion which is relatively low in the required rigidity can be reduced in weight as much as possible.

Namely, when the tensile stress has been inputted, the arm section 12 is stretched by the first ring section 14, the inner cylinders 15a and 17a move apart from each other, and, as shown in FIG. 9, the inner cylinder 17a is pressed on the rear portion 16b. Then, the second ring section 16 changes into substantially an oval shape, and the large stress is exerted on the front portion 16a and the rear portion 16b, particularly on the rear portion 16b (in FIG. 9, the change into the oval shape is shown in an exaggerated way).

In the rear portion 16b, however, the number of ribs is increased and the density of ribs is increased by the second ribs 22 and the plurality of third ribs 23 while the amount of the lightening (the wall thickness reduction) is decreased. Therefore, the rigidity of the rear portion 16b is heightened, so that the rear portion 16b can bear the large stress.

On the other hand, the front portion 16a also is subjected to the comparatively large stress. On the side of the front portion 16a, the radii of the portions are changed such that the first radius R1 is changed into R1a, the second radius R2 is changed into R2 a, the third radius R3 is changed into R3 a and the fourth radius R4 is changed into R4 a. However, since the front portion 16a is not pressed by the inner cylinder 17a and is connected continuously to the arm section 12, the rigidity is not required as high as the rear portion 16b. Therefore, even if the front portion 16a is reduced in the number of ribs and formed by the first rib 21, the second ribs 22 and the fourth ribs 24, the sufficiently high rigidity can be maintained.

Moreover, by reducing the number of the ribs, a large amount of the lightening (the wall thickness reduction) can be carried out through the first recesses 31, the third recesses 33 and the fourth recesses 34, whereby to achieve the weight reduction as much as possible.

Accordingly, the distribution of the rigidity can be optimized in accordance with the differences of the required rigidity while considering the differences of the rigidity required in the forward and backward direction of the second ring section 16, whereby the weight reduction can be achieved as much as possible.

Further, since the area of the first rib 21 which is connected continuously to the arm section 12 is wider than that of the second rib 22 so as to form the enlarged diameter portion 46, the high rigidity can be realized in the joint region between the arm section 12 and the second ring section 16. Therefore, even if the inner cylinder 17a is pressed on the rear portion 16b as shown in FIG. 9, the excessive deformation of the second ring section 16 can be prevented by the increased rigidity of the first rib 21 whereby it is possible to improve the durability.

Furthermore, since the arm section 12 is located in front of the second ring section 16, the enlarged diameter portion 46 is easily extended forwardly, whereby it is easy to form the enlarged diameter portion 46 of a large size and the wall thickness reducing portion (the first recess 31) of a large size. In addition, in comparison with the case where a portion corresponding to the enlarged diameter portion 46 is provided on the rear side portion 16B, it is possible to obtain the enlarged diameter portion 46 having the higher rigidity and the more compact configuration.

Then, even if the second rib 22 is of annular shape and is formed around the circumference while the first rib 21 is provided in a only portion (the front side portion 16 A) of the circumference of the second ring section 16, the first rib 21 has a large area by increasing the width more than the second rib 22 so as to form the enlarged diameter portion 46, so that the deformation of the second ring section 16 can be effectively controlled thereby to alleviate the stress concentration.

Namely, when the second ring section 16 changes from a circular shape to an oval shape at the time of inputting the tension for instance, if the rigidity of the front side portion 16A is insufficient, the stress concentration is caused also at the front portion 16a of the second ring section 16 so that the front portion 16a is damaged.

However, when the width W2 of the first rib 21 provided in the only front side portion 16A of the second ring section 16 is made wider than the width W3 of the second rib 22 provided around the periphery thereof whereby to form the enlarged diameter portion 46 and to make the area of the first rib larger, the rigidity in the front side portion 16A can be increased sufficiently. Thus, since the deformation in the front side portion 16A of the second ring section 16 can be controlled effectively and the stress concentration can be alleviated, the durability is improved.

Further, although the second rib 22 is narrower in width than the first rib 21, it is formed in an annular configuration at both ends of the tubular portion 16f in the axial direction of the second ring section 16. Therefore, the rigidity at both ends in the axial direction of the tubular portion 16f can be increased. In addition, the second rib 22 can be reduced in weight for the width narrower than the first rib 21. Moreover, since the maximum projecting amount in the left and right direction of the enlarged diameter portion 46 corresponds with the second rib 22 so as to be the minimum center distance r1, the downsizing or compactification in the left and right direction can be achieved.

Further, when the minimum distance of the center distance between the center Q and the outer periphery of the ring section is the r1, the center distance r2 of the first rib 21 is configured to be 1 or more. Therefore, the enlarged diameter portion 46 can be provided in the first rib 21.

Furthermore, since the first radius R1 of the first rib 21 is increased and the fourth radius R4 of the fourth rib 24 is relatively decreased, the first rib 21 can be formed wider than and longer than the fourth rib 24. Due to this, the fourth rib 24 can distribute the stress of the second rib 22 to the intermediate portion in the forward and backward direction and to the center portion in the left and right direction, of the arm portion of the first rib 21, and the first rib 21 can distribute the stress of the second rib 22 wider than the center portion and forwardly of the intermediate portion. The effect of this favorable stress distribution can be expected similarly in the case where both of the first rib 21 and the fourth rib 24 are formed in a rectilinear configuration, for instance.

Further, when the front portion 16a is deformed in FIG. 9, the first rib 21 can be smoothly connected continuously to the arm section 12 at moderate angles at the time of this deformation, so that the stress distribution can be performed in good conditions thereby making it possible to alleviate the stress concentration.

Further, since the horizontal ribs (the first ribs 21, the third ribs 23 and the second ribs 22) which are different in shape and in space size are integrally connected continuously by the fifth rib 25 as the vertical rib, the proper number of ribs can be arranged in each of places in the suitable configuration, whereby the entire rigidity can be increased.

In addition, since these horizontal and vertical ribs are formed flush with the outer surface of the fifth rib 25, and the outer surface of the fifth rib 25 forms the straight line portion 49, the projection in the left and right direction can be prevented thereby making it possible to achieve the compactification.

Moreover, even if the second ribs 22 are located apart in the direction of the axis C2 from the first ribs 21, the second ribs 22 can be reinforced by the oblique fourth ribs 24 at the shortest distance.

In addition, with the arrangement of the fourth ribs 24, the front side portion 16A is able to have the sufficient rigidity. Since the enlarged diameter portion 46 is not required to project forwardly, it can be slimmed.

Further, since the second rib 22 is connected through the fourth rib 24 to the first rib 21 in the front portion 16a on which the stress is exerted, the high rigidity can be obtained by a possibly little reinforcement. In addition, with arrangement of the third recess 33 and the fourth recess 34, the weight reduction can be achieved even if the second rib 22 and the fourth rib 24 are provided.

In particular, the fourth recess 34 of a triangular shape is provided between the fourth rib 24 and the first rib 21, and the depth D2 of the third recess 33 and the depth D3 of the fourth recess 34 are deeper than the depths D1 of the second recess 32 and the fifth recess 35 each of which is formed between the third rib 23 and the second rib 22, so that it is possible to reduce the weight. In addition, since the depth D2 of the third recess 33 and the depth D3 of the fourth recess 34 are deepened respectively, the projecting height of the first rib 21 can be increased so as to provide a large area, and the projecting amount in the left and right direction of the whole second ring section 16 can be controlled thereby to be compactified. Moreover, since the ribs are formed by the deep recesses, the occurrence of the void (a gap produced by a blowhole at the time of molding) can be decreased thereby to improve the rigidity of the ribs.

By the way, the present invention is not limited to the above embodiments, and various changes and modifications may be made in the invention without departing from the spirit and scope thereof.

For instance, the vibration isolating device of the present invention can be applied to various kinds of vibration isolating connecting members without being limited to the torque rod.

What is claimed is:

1. A vibration isolating device comprising:
   a main body including an arm section, a first ring section, and a second ring section, said first and second ring sections being each located on a respective end in a longitudinal direction of the arm section;
   a first bushing being provided in the first ring section;
   a second bushing being provided in the second ring section; and
   a plurality of horizontal ribs that extend in a plane orthogonal to a center axis of the second bushing, being formed on an outer periphery of at least the second ring section of the ring sections in a direction of the center axis of the second bushing;
   wherein the second ring section has a front side portion, which is connected to the arm section on a forward side with respect to the center axis of the second busing, and a rear side portion located on an opposite side; and
   wherein, in a plan view, the horizontal ribs are placed in an upwardly and downwardly overlapping relationship with each other and include a first rib and a second rib, which are different in area, wherein the first rib of a larger area has an enlarged diameter portion extending outwardly of the second rib of a smaller area and connecting the arm section and the second ring section, and the second rib is provided to extend from the front side portion to the rear side portion; and wherein the first rib extends from the arm section to only an outer periphery of the front side portion.

2. The vibration isolating device according to claim 1, wherein, letting a minimum distance of a center distance between an outer periphery of the first rib and a center of the bushing be 1, a center distance between an outer periphery of the enlarged diameter portion and the center is not less than 1.

3. The vibration isolating device according to claim 2, wherein the first rib, the second rib and another third horizontal rib are provided on the outer periphery of the ring section, and recesses are formed along each of the horizontal ribs, and wherein a depth of the recess extending along the enlarged diameter portion of the first rib is greater than a depth of the recess extending along the third rib.

4. The vibration isolating device according to claim 3, wherein, in a front view, a plurality of ribs including the first rib are provided in the front side portion, and a plurality of ribs including the third rib different from the first rib and the second rib are provided in the rear side portion, and wherein the number of ribs provided in the front side portion is different from the number of ribs provided in the rear side portion.

5. The vibration isolating device according to claim 4, wherein the horizontal ribs of the front side portion and the rear side portion are continuously formed integral with each other by a vertical rib which is formed long in the axial direction of the bushing on an outer peripheral surface of the one of the ring sections.

6. The vibration isolating device according to claim 5, wherein the second rib is formed in an annular shape on an end portion in an axial direction of the one of the ring sections, and the second rib is located outwardly in the axial direction with respect to the first rib.

7. The vibration isolating device according to claim 6, wherein the second rib is connected obliquely through a fourth rib to the first rib.

8. The vibration isolating device according to claim 7, wherein, in a plan view, an outer peripheral portion of the enlarged diameter portion of the first rib and an edge portion in a left and right direction of the fourth rib have a curved portion, respectively, and wherein a radius of the curved portion of the first rib is greater than a radius of the curved portion of the fourth rib.

9. The vibration isolating device according to claim 8, further comprising lightening recesses which are formed between the first rib and each of the second rib and the fourth rib.

10. The vibration isolating device according to claim 7, further comprising lightening recesses which are formed between the first rib and each of the second rib and the fourth rib.

11. The vibration isolating device according to claim 1, wherein the first rib, the second rib and another third horizontal rib are provided on the outer periphery of the ring section, and the third rib is provided only in the rear side portion.

12. The vibration isolating device according to claim 11, wherein, in a front view, a plurality of horizontal ribs including the first rib are provided in the front side portion, and a plurality of horizontal ribs including the second rib second rib and the third rib are provided in the rear side portion, and wherein the number of horizontal ribs provided in the front side portion is larger than the number of horizontal ribs provided in the rear side portion.

13. The vibration isolating device according to claim 12, wherein all of the horizontal ribs of the front side portion and the rear side portion are continuously formed integral with each other by a vertical rib, which is formed long in the axial direction on an outer peripheral surface of the second ring section.

14. The vibration isolating device according to claim 13, wherein the second rib is formed in an annular shape on an end portion in an axial direction of the second ring section, and the second rib is located outwardly in the axial direction with respect to the first rib.

15. The vibration isolating device according to claim 14, wherein the second rib is connected obliquely through a fourth rib to the first rib.

16. The vibration isolating device according to claim 15, wherein, in a plan view, an outer peripheral portion of the enlarged diameter portion of the first rib and an edge portion in a left and right direction of the fourth rib have a curved portion, respectively, and wherein a radius of the curved portion of the first rib is greater than a radius of the curved portion of the fourth rib.

17. The vibration isolating device according to claim 16, further comprising lightening recesses which are formed between the first rib and each of the second rib and the fourth rib.

18. The vibration isolating device according to claim 15, further comprising lightening recesses which are formed between the first rib, and each of the second rib and the fourth rib.

19. The vibration isolating device according to claim 11, further comprising recesses that are formed along each of the first rib, the second rib, and the third rib, and wherein depths of the recesses extending along the enlarged diameter portion of the first rib are greater than a depth of the recess extending along the third rib.

* * * * *